United States Patent
Fei

(10) Patent No.: US 9,537,620 B2
(45) Date of Patent: Jan. 3, 2017

(54) METHOD AND DEVICE FOR ALLOCATING RESOURCE LOCATION WITH FREQUENCY HOPPING FUNCTION

(75) Inventor: Peiyan Fei, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 218 days.

(21) Appl. No.: 14/119,298

(22) PCT Filed: Dec. 5, 2011

(86) PCT No.: PCT/CN2011/083474
§ 371 (c)(1),
(2), (4) Date: Nov. 21, 2013

(87) PCT Pub. No.: WO2012/151971
PCT Pub. Date: Nov. 15, 2012

(65) Prior Publication Data
US 2014/0198745 A1    Jul. 17, 2014

(30) Foreign Application Priority Data
May 12, 2011   (CN) .......................... 2011 1 0122634

(51) Int. Cl.
  *H04L 5/00*       (2006.01)
  *H04W 72/04*      (2009.01)
  *H04B 1/7156*     (2011.01)

(52) U.S. Cl.
  CPC ........... *H04L 5/0012* (2013.01); *H04B 1/7156* (2013.01); *H04W 72/0453* (2013.01)

(58) Field of Classification Search
  None
  See application file for complete search history.

(56) References Cited

U.S. PATENT DOCUMENTS

| 8,499,337 B1 | 7/2013 | Kenny et al. |
| 2005/0111431 A1 | 5/2005 | Gotesman et al. |

(Continued)

FOREIGN PATENT DOCUMENTS

| CN | 101394199 A | 3/2009 |
| CN | 101771444 A | 7/2010 |

(Continued)

OTHER PUBLICATIONS

Supplementary European Search Report in European application No. 11865034.0, mailed on Oct. 8, 2014. (6 pages—see entire document).

(Continued)

*Primary Examiner* — Jamal Javaid
*Assistant Examiner* — George Atkins, Jr.
(74) *Attorney, Agent, or Firm* — Oppedahl Patent Law Firm LLC

(57) ABSTRACT

The disclosure provides a method and device for allocating a resource location with a frequency hopping function. The method includes: an uplink bandwidth of a Long Term Evolution (LTE) communication system is acquired; it is determined whether frequency hopping information needs to be allocated to uplink continuous frequency-domain resource location information in a multi-antenna port transmission mode, and when the frequency hopping information needs to be allocated, a length of a resource location and frequency hopping bit indicator and a length of frequency-domain resource location information are obtained according to the uplink bandwidth; a difference Value_D between the length of the resource location and frequency hopping bit indicator and the length of the frequency-domain resource location information is calculated; and frequency hopping information is allocated to the frequency-domain resource location information according to the difference Value_D. With the technical solution of the disclosure, allocation of (Continued)

frequency-domain resource location information with a frequency hopping function in a multi-port transmission mode can be supported.

6 Claims, 3 Drawing Sheets

(56) References Cited

U.S. PATENT DOCUMENTS

| | | |
|---|---|---|
| 2006/0143444 A1 | 6/2006 | Malkamaki et al. |
| 2009/0006495 A1 | 1/2009 | Ramasubramanian et al. |
| 2009/0175159 A1* | 7/2009 | Bertrand et al. ............. 370/203 |
| 2009/0222894 A1 | 9/2009 | Kenny et al. |
| 2011/0110603 A1 | 5/2011 | Ikai |
| 2011/0255485 A1 | 10/2011 | Chen et al. |
| 2011/0280203 A1* | 11/2011 | Han et al. .................... 370/329 |
| 2012/0207117 A1 | 8/2012 | Malkamäki et al. |
| 2013/0089063 A1* | 4/2013 | Yang et al. .................. 370/329 |

FOREIGN PATENT DOCUMENTS

| | | |
|---|---|---|
| CN | 101778475 A | 7/2010 |
| EP | 2312853 A1 | 4/2011 |
| WO | 2008113720 A1 | 9/2008 |
| WO | 2010111037 A1 | 9/2010 |
| WO | 2011047353 A1 | 4/2011 |

OTHER PUBLICATIONS

International Search Report in international application No. PCT/CN2011/083474 mailed on Mar. 15, 2012. (3 pages—see entire document).

English Translation of the Written Opinion of the International Search Authority in international application No. PCT/CN2011/083474 mailed on Mar. 15, 2012. (5 pages—see entire document).

* cited by examiner

METHOD AND DEVICE FOR ALLOCATING RESOURCE LOCATION WITH FREQUENCY HOPPING FUNCTION

TECHNICAL FIELD

The disclosure relates to the field of mobile communication technologies, and in particular to a method and device for allocating a resource location with a frequency hopping function in an uplink multi-port transmission mode.

BACKGROUND

In a Long Term Evolution (LTE) Frequency-Division Multiplexing (FDM) system of a 3rd Generation Partnership Project (3GPP), an uplink physical channel transmits data using a single antenna and resource allocation is continuous resource allocation, which limits the transmission rate of uplink data, because resources cannot be utilized flexibly, for example, when multiple segment frequency bands exist in a system bandwidth.

Compared with the above system, an International Mobile Telecommunications-Advanced (IMT-Advanced) system proposes a higher data rate and greater system capacity. In order to meet requirements of IMT-Advanced, Long Term Evolution-Advanced (LTE-A), as an evolution standard of LTE, proposes uplink non-continuous resource allocation technology, by which a spectrum efficiency of the IMT-Advanced system can be improved.

Meanwhile, in order to meet the requirement on an uplink transmit rate of IMT-Advanced, the LTE-A proposes a multi-port transmission mode, in which an uplink shared channel can support multiple transmission blocks. In an uplink of an LTE-A system, a User Equipment (UE) can support to simultaneously transmit up to two transmission blocks.

Rapid development of digital communication systems puts forwards a higher demand on the reliability of data communication. However, in severe channels, multi-path interference, Doppler frequency shift and the like seriously impact system performance. Therefore, in order to adapt to the requirement on a high data rate of a terminal, a method for allocating resources under multiple ports is provided for allocation of resources during uplink transmission, so as to improve the probability of correct reception of data and the amount of uploaded data during data transmission.

However, in an existing LTE system, an existing method for expressing downlink control information does not support allocation of frequency hopping information to continuous resource location information with the frequency hopping function in a multi-port transmission mode. If a separate field is created in downlink control information to indicate frequency hopping information, the structure of the existing downlink control information would be changed.

SUMMARY

In view of this, the disclosure is intended to provide a method and device for allocating a resource location with a frequency hopping function, so as to support allocation of frequency-domain resource location information with a frequency hopping function in a multi-port transmission mode.

A technical solution adopted by the disclosure to resolve a technical problem thereof is as follows.

A method for allocating a resource location with a frequency hopping function includes:

an uplink bandwidth of a Long Term Evolution (LTE) communication system is acquired;

it is determined whether frequency hopping information needs to be allocated to uplink continuous frequency-domain resource location information in a multi-antenna port transmission mode, and when the frequency hopping information needs to be allocated, a length of a resource location and frequency hopping bit indicator and a length of frequency-domain resource location information are obtained according to the uplink bandwidth;

a difference Value_D between the length of the resource location and frequency hopping bit indicator and the length of the frequency-domain resource location information is calculated; and frequency hopping information is allocated to the frequency-domain resource location information according to the difference Value_D.

Preferably, the allocating frequency hopping information to the frequency-domain resource location information according to the difference Value_D may include:

when Value_D=0, frequency hopping is disabled;

when Value_D=1, frequency hopping is disabled, and an extra 1 bit is set to 0 or 1;

when Value_D=2 and the uplink bandwidth is no less than 6 and no greater than 49, a frequency hopping enable indicator is set using 1 bit and a frequency hopping type indicator is set using other 1 bit;

when Value_D=2 and the uplink bandwidth is no less than 50 and no greater than 110, frequency hopping is disabled;

when Value_D=3 and the uplink bandwidth is no less than 6 and no greater than 49, a frequency hopping enable indicator is set using 1 bit and a frequency hopping type indicator is set using other 2 bits, or a frequency hopping enable indicator is set using 2 bits and a frequency hopping type indicator is set using other 1 bit; and when Value_D=3 and the uplink bandwidth is no less than 50 and no greater than 110, a frequency hopping enable indicator is set using 1 bit and the other 2 bits are set to indicate a frequency hopping type.

Preferably, the method may further include: after the frequency hopping information is allocated to the frequency-domain resource location information according to the difference Value_D, the frequency hopping information and the frequency-domain resource location information into downlink control information are incorporated, and the downlink control information is issued to a terminal for instructing the terminal to transmit data information.

Preferably, the frequency-domain resource location information may be placed at a Most Significant Bit (MSB) of the control information or at a Least Significant Bit (LSB) of the control information; and bit information of indicating frequency hopping enabled may be before bit information of indicating a frequency hopping type.

Preferably, the obtained length of the resource location and frequency hopping bit indicator may be equal to $$\left\lceil \log_2\left(\binom{\lceil N_{RB}^{UL}/P+n\rceil}{4}\right)\right\rceil$$

or $$\left\lceil \log_2\left(\binom{\lceil N_{RB}^{UL}/P\rceil+n}{4}\right)\right\rceil,$$

where n represents an integer greater than 0, $N_{RB}^{UL}$ represents the uplink bandwidth, P represents a size of a Resource Block Group (RBG) and a value of P depends on the uplink bandwidth.

A device for allocating a resource location with a frequency hopping function includes:

a bandwidth acquisition unit, configured to acquire an uplink bandwidth of an LTE communication system;

an information determination unit, configured to: determine whether frequency hopping information needs to be allocated to uplink continuous frequency-domain resource location information in a multi-antenna port transmission mode, and when the frequency hopping information needs to be allocated, obtain a length of a resource location and frequency hopping bit indicator and a length of the frequency-domain resource location information according to the uplink bandwidth;

a calculation unit, configured to calculate a difference Value_D between the length of the resource location and frequency hopping bit indicator and the length of the frequency-domain resource location information; and an allocation-and-representation unit, configured to allocate frequency hopping information to the frequency-domain resource location information according to the difference Value_D.

Preferably, that the allocation unit may be configured to:
when Value_D=0, disable frequency hopping;
when Value_D=1, disable frequency hopping, and set an extra 1 bit to 0 or 1;
when Value_D=2 and the uplink bandwidth is no less than 6 and no greater than 49, set a frequency hopping enable indicator using 1 bit and set a frequency hopping type indicator using other 1 bit;
when Value_D=2 and the uplink bandwidth is no less than 50 and no greater than 110, disable frequency hopping;
when Value_D=3 and the uplink bandwidth is no less than 6 and no greater than 49, set a frequency hopping enable indicator using 1 bit and a frequency hopping type indicator using other 2 bits, or set a frequency hopping enable indicator using 2 bits and a frequency hopping type indicator using other 1 bit; and
when Value_D=3 and the uplink bandwidth is no less than 50 and no greater than 110, set a frequency hopping enable indicator using 1 bit and set a frequency hopping type indicator using other 2 bits.

Preferably, the device may further include: an information combination unit, configured to: incorporate the frequency hopping information and the frequency-domain resource location information into downlink control information, and issue the downlink control information to a terminal for instructing the terminal to transmit data information.

Preferably, the frequency-domain resource location information may be placed at an MSB of the control information or at an LSB of the control information; and bit information of indicating frequency hopping enabled may be before bit information of indicating a frequency hopping type.

Preferably, the length of the resource location and frequency hopping bit indicator obtained through calculation by the information determination unit may be equal to $$\left\lceil \log_2\left(\binom{\lceil N_{RB}^{UL}/P \rceil + n}{4}\right)\right\rceil$$

or

-continued $$\left\lceil \log_2\left(\binom{\lceil N_{RB}^{UL}/P \rceil + n}{4}\right)\right\rceil,$$

where n represents an integer greater than 0, $N_{RB}^{UL}$ represents the uplink bandwidth, P represents a size of a RBG and a value of P depends on the uplink bandwidth.

1. In this document $$\binom{y}{x} = C_y^x,$$

that is, permutation and combination calculation, $$C_y^x = \frac{P_y^x}{x!}.$$

Implementation of the technical solution of the disclosure has the following beneficial effects: the method and device for allocating a resource location with a frequency hopping function provided by the disclosure can avoid the defect of incapability of implementing frequency hopping in a multi-port transmission mode in an existing LTE system, through allocating frequency hopping information to frequency-domain resource location information according to a difference between the length of a resource location and frequency hopping bit indicator and the length of the frequency-domain resource location information, thus achieving allocation of frequency hopping information to continuous frequency-domain resource location information in the multi-port transmission mode. Meanwhile, combining the frequency hopping information and the frequency-domain resource location information into downlink control information, compared with a method for separating frequency hopping information from resource location allocation information, can achieve a good integration with control information in the multi-port transmission mode in existing LTE without changing an existing LTE information structure. In addition, the transmission efficiency of uplink data can be improved through the method and device provided by the disclosure.

DETAILED DESCRIPTION

The basic idea of the disclosure is: an uplink bandwidth of a Long Term Evolution (LTE) communication system is acquired; it is determined whether frequency hopping information needs to be allocated to uplink continuous frequency-domain resource location information in a multi-antenna port transmission mode, and when the frequency hopping information needs to be allocated, a length of a resource location and frequency hopping bit indicator and a length of frequency-domain resource location information are obtained according to the uplink bandwidth; a difference Value_D between the length of the resource location and frequency hopping bit indicator and the length of the frequency-domain resource location information is calculated; and frequency hopping information is allocated to the frequency-domain resource location information according to the difference Value_D.

In order to make the purpose, technical solution and advantages of the disclosure clearer and easier to understand, the disclosure is further elaborated below with reference to the drawings and embodiments. It should be understood that specific embodiments described here are merely used to illustrate the disclosure instead of limiting the disclosure.

Figure 1:
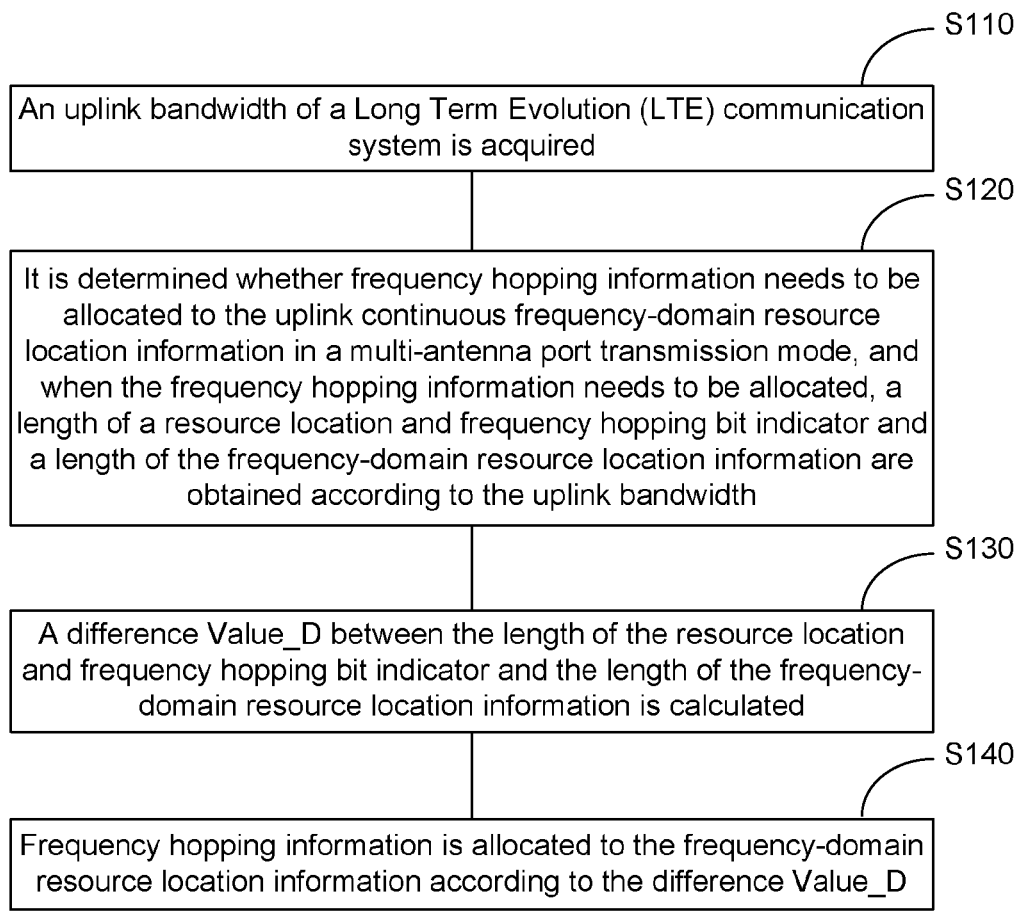
FIG. 1 shows a flowchart of a method provided by an embodiment of the disclosure.

An embodiment of the disclosure provides a method for allocating a resource location with a frequency hopping function, as shown in FIG. 1. The method includes the following steps:

S110: an uplink bandwidth $N_{RB}^{UL}$ of an LTE communication system is acquired.

S120: It is determined whether frequency hopping information needs to be allocated to uplink continuous frequency-domain resource location information in a multi-antenna port transmission mode, and when the frequency hopping information needs to be allocated, obtaining the length of a resource location and frequency hopping bit indicator and the length of the frequency-domain resource location information according to the uplink bandwidth.

The length of resource location and frequency hopping bit indicator is equal to $$\left\lceil \log_2\left( \binom{\lceil N_{RB}^{UL}/P + n \rceil}{4} \right) \right\rceil$$

or $$\left\lceil \log_2\left( \binom{\lceil N_{RB}^{UL}/P \rceil + n}{4} \right) \right\rceil,$$

where n represents an integer greater than 0. $N_{RB}^{UL}$ represents the uplink bandwidth, P represents the size of an RBG, the operator ⌈ ⌉ represents ceiling function and the value of P depends on the uplink bandwidth, as specifically shown in Table 1. The length of the frequency-domain resource location information is $\lceil \log_2(N_{RB}^{UL}(N_{RB}^{UL}+1)/2) \rceil$, where $N_{RB}^{UL}$ represents the uplink bandwidth. If the frequency hopping information needs not to be allocated, then the process of the method is exited.

TABLE 1

| Uplink Bandwidth $N_{RB}^{UL}$ | RBG size (P) |
|---|---|
| ≤10 | 1 |
| 11-26 | 2 |
| 27-63 | 3 |
| 64-110 | 4 |

S130: a difference Value_D between the length of the resource location and frequency hopping bit indicator and the length of the frequency-domain resource location information is calculated.

S140: frequency hopping information is allocated to the frequency-domain resource location information according to the difference Value_D. The frequency hopping information includes bit information of indicating frequency hopping enabled and bit information of indicating a frequency hopping type.

Table 2 shows a corresponding relationship between the length of a hopping bit indicator and bit information:

TABLE 2

| Uplink Bandwidth $N_{RB}^{UL}$ | Length of a Hopping Bit Indicator | Bit Information |
|---|---|---|
| 6-49 | 1 | 0 |
|  |  | 1 |
| 50-110 | 2 | 00 |
|  |  | 01 |
|  |  | 10 |
|  |  | 11 |

As shown in Table. 2, in a more specific embodiment, S140 includes:

when Value_D=0, frequency hopping is disabled;

when Value_D=1, frequency hopping is disabled, and an extra 1 bit is set to 0 or 1;

when Value_D=2 and the uplink bandwidth is no less than 6 resource blocks and no greater than 49 resource blocks, a frequency hopping enable indicator is set using 1 bit and a frequency hopping type indicator is set using the other 1 bit;

when Value_D=2 and the uplink bandwidth is no less than 50 resource blocks and no greater than 110 resource blocks, frequency hopping is disabled;

when Value_D=3 and the uplink bandwidth is no less than 6 resource blocks and no greater than 49 resource blocks, a frequency hopping enable indicator is set using 1 bit and a frequency hopping type indicator is set using the other 2 bits, or a frequency hopping enable indicator is set using 2 bits and a frequency hopping type indicator is set using the other 1 bit; in other words:

when 2 bits are used to indicate a frequency hopping type, the 2 bits of indicating a frequency hopping type may be 00, 01, 10 or 11. One of 00, 01, 10 and 11 can be used to indicate frequency hopping type 1 while another of 00, 01, 10 and 11 can be used to indicate frequency hopping type 2. Preferably, the frequency hopping type 1 selects 00, and the frequency hopping type 2 selects 11; and when 2 bits are used to indicate frequency hopping enabled, the 2 bits of indicating frequency hopping enabled may be 00, 01, 10 or 11. One of 00, 01, 10 and 11 can be select to indicate frequency hopping disabled while another of 00, 01, 10 and 11 can be selected to indicate frequency hopping enabled. Preferably, disabled frequency hopping selects 00, and enabled frequency hopping selects 11; and when Value_D=3 and the uplink bandwidth is no less than 50 resource blocks and no greater than 110 resource blocks, a frequency hopping enable indicator is set using 1 bit and a frequency hopping type indicator is set using other 2 bits.

The method can avoid the defect of incapability of implementing frequency hopping in the multi-port transmission mode in an existing LTE system by allocating frequency hopping information to the frequency-domain resource location information according to the difference between the length of the resource location and frequency hopping bit indicator and the length of the frequency-domain resource location information, thus achieving allocation of frequency hopping information to continuous frequency-domain resource location information in the multi-port transmission mode.

Figure 2:
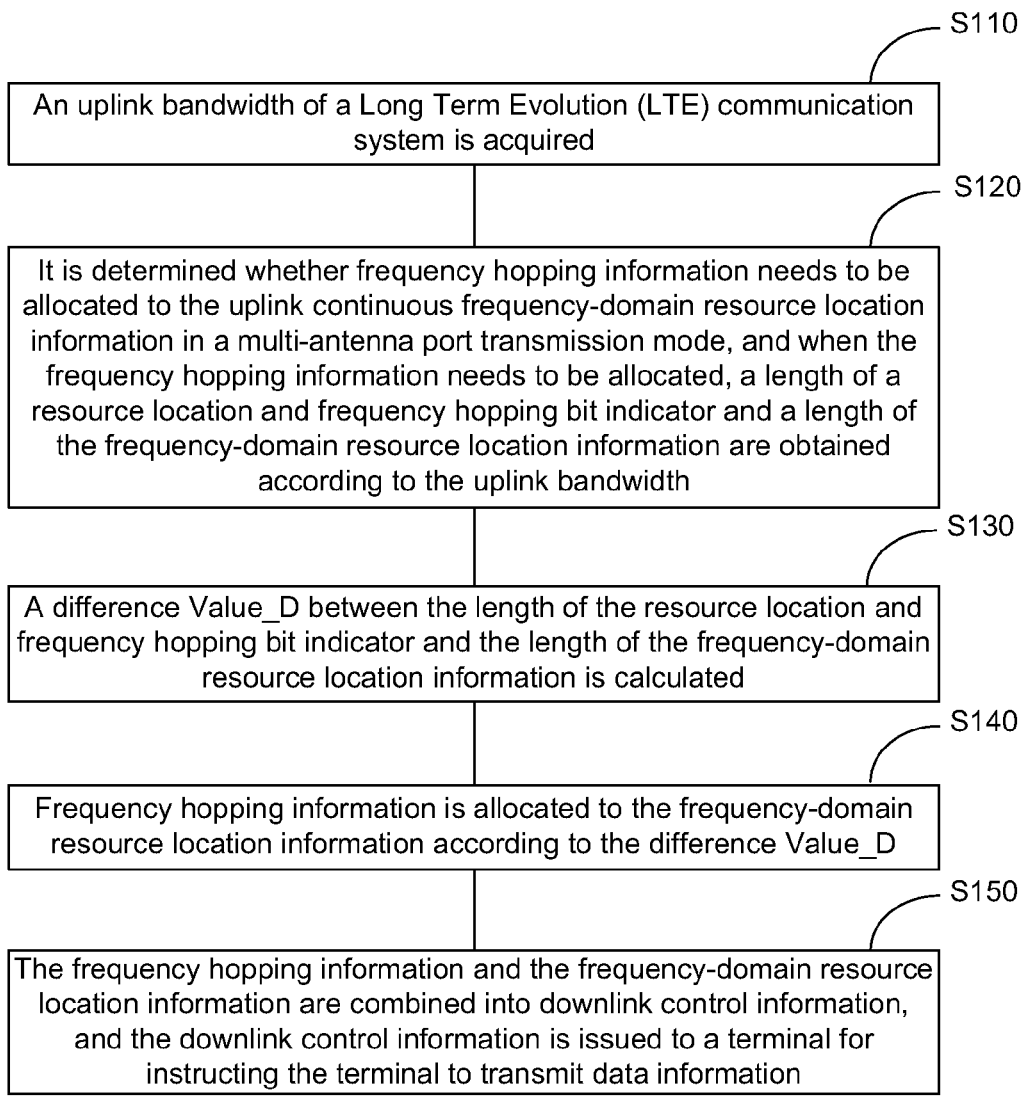
FIG. 2 shows another flowchart of a method provided by an embodiment of the disclosure.

In other embodiments, the result of formula $\lceil \log_2(N_{RB}^{UL}(N_{RB}^{UL}+1)/2) \rceil$ is the length of frequency-domain resource location information. after the aforementioned step S140, as shown in FIG. 2, the method further includes:

S150: the frequency hopping information and the frequency-domain resource location information into downlink control information are incorporated, and the downlink control information is issued to a terminal for instructing the terminal to transmit data information. Combining the frequency hopping information and the frequency-domain resource location information through the uplink bandwidth, compared with the method for separating frequency hopping information from resource location allocation information, can achieve a good integration with control information in the multi-port transmission mode in existing LTE without changing the existing LTE information structure. In addition, the transmission efficiency of uplink data can be improved.

In the above embodiments, preferably, the frequency hopping information is placed at an MSB (Most Significant Bit) of the control information, and the frequency-domain resource location information is placed at an LSB (Least Significant Bit) of the control information; or, the frequency hopping information is placed at the LSB of the control information, and the frequency-domain resource location information is placed at the MSB of the control information. And, bit information of indicating frequency hopping enabled is before bit information of indicating a frequency hopping type; or, bit information of indicating frequency hopping enabled is before bit information of indicating a frequency hopping type. Here, the frequency hopping information includes the bit information of indicating frequency hopping enabled and the bit information of indicating a frequency hopping type.

Figure 3:
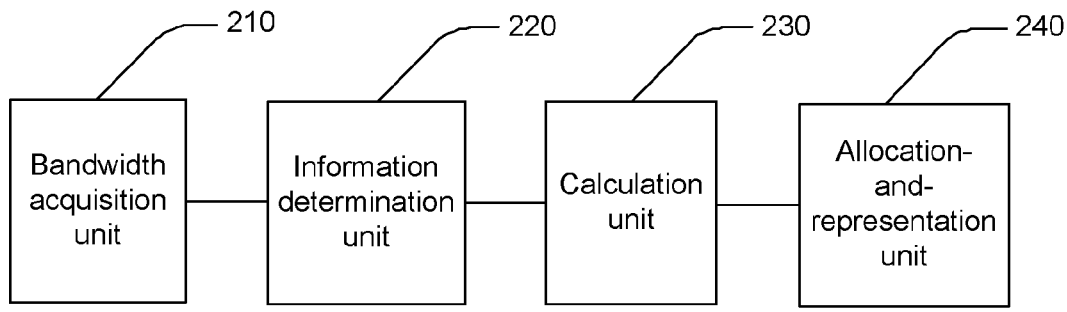
FIG. 3 shows a schematic diagram of a structure of a device provided by an embodiment of the disclosure.

An embodiment of the disclosure also provides a device for allocating a resource location with a frequency hopping function. The device is network-side equipment, as shown in FIG. 3. The device includes:

a bandwidth acquisition unit 210, configured to an uplink bandwidth $N_{RB}^{UL}$ of an LTE communication system;

an information determination unit 220, configured to: determine whether frequency hopping information needs to be allocated to uplink continuous frequency-domain resource location information in the multi-antenna port transmission mode, and when the frequency hopping information needs to be allocated, obtain the length of a resource location and frequency hopping bit indicator and the length of the frequency-domain resource location information according to the uplink bandwidth. The length of resource location and frequency hopping bit indicator is $$\left\lceil \log_2\left( \binom{\lceil N_{RB}^{UL}/P + n \rceil}{4} \right) \right\rceil$$

or $$\left\lceil \log_2\left( \binom{\lceil N_{RB}^{UL}/P \rceil + n}{4} \right) \right\rceil,$$

where n represents an integer greater than 0, $N_{RB}^{UL}$ represents the uplink bandwidth, P represents the size of an RBG and the value of P depends on the uplink bandwidth; the length of the frequency-domain resource location information is $\lceil \log_2(N_{RB}^{UL}(N_{RB}^{UL}+1)/2) \rceil$;

a calculation unit 230, configured to calculate the difference Value_D between the length of the resource location and frequency hopping bit indicator and the length of the frequency-domain resource location information; and an allocation-and-representation unit 240, configured to allocate frequency hopping information to the frequency-domain resource location information according to the difference Value_D.

In a more specific embodiment, the allocation-and-representation unit 240 is configured to:

when Value_D=0, disable frequency hopping;
when Value_D=1, disable frequency hopping, and set an extra 1 bit to 0 or 1;
when Value_D=2 and the uplink bandwidth is no less than 6 resource blocks and no greater than 49 resource blocks, set a frequency hopping enable indicator using 1 bit and set a frequency hopping type indicator using other 1 bit;
when Value_D=2 and the uplink bandwidth is no less than 50 resource blocks and no greater than 110 resource blocks, disable frequency hopping;
when Value_D=3 and the uplink bandwidth is no less than 6 resource blocks and no greater than 49 resource blocks, set a frequency hopping enable indicator using 1 bit and set a frequency hopping type indicator using other 2 bits, or set a frequency hopping enable indicator using 2 bits and set a frequency hopping type indicator using other 1 bit; in other words:
when 2 bits are used to indicate a frequency hopping type, the 2 bits of indicating a frequency hopping type may be 00, 01, 10 or 11. One of 00, 01, 10 and 11 can be used to indicate frequency hopping type 1 while another of 00, 01, 10 and 11 can be used to indicate frequency hopping type 2. Preferably, the frequency hopping type 1 selects 00, and the frequency hopping type 2 selects 11; and
when 2 bits are used to indicate frequency hopping enabled, the 2 bits of indicating frequency hopping enabled may be 00, 01, 10 or 11. One of 00, 01, 10 and 11 can be select to indicate frequency hopping disabled while another of 00, 01, 10 and 11 can be selected to indicate frequency hopping enabled. Preferably, disabled frequency hopping selects 00, and enabled frequency hopping selects 11; and
when Value_D=3 and the uplink bandwidth is no less than 50 resource blocks and no greater than 110 resource blocks, a frequency hopping enable indicator is set using 1 bit and a frequency hopping type indicator is set using the other 2 bits.

The device can avoid the defect of incapability of implementing frequency hopping in the multi-port transmission mode in an existing LTE system by allocating frequency hopping information to the frequency-domain resource location information according to the difference between the length of the resource location and frequency hopping bit indicator and the length of the frequency-domain resource location information, thus achieving allocation of frequency hopping information to continuous frequency-domain resource location information in the multi-port transmission mode.

Figure 4:
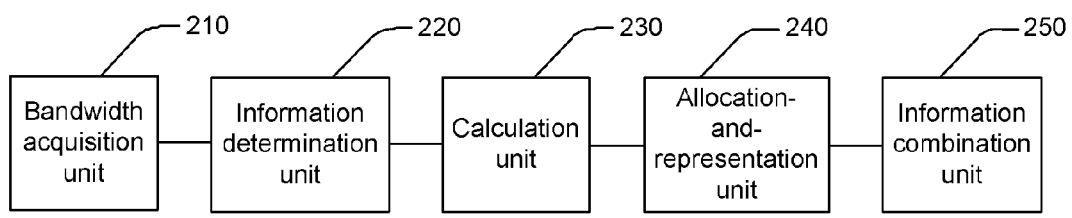
FIG. 4 shows a schematic diagram of another structure of a device provided by an embodiment of the disclosure.

In other embodiments, on the basis of the aforementioned embodiments, as shown in FIG. 4, the device further includes: an information combination unit 250, configured to: incorporate the frequency hopping information and the frequency-domain resource location information into downlink control information, and issue the downlink control information to a terminal for instructing the terminal to transmit data information. The downlink control information is issued to a terminal for instructing the terminal to transmit data information. Here, combining the frequency hopping information and the frequency-domain resource location information through uplink bandwidth, compared with the method for separating frequency hopping information from resource location allocation information, can achieve a good integration with control information in the multi-port transmission mode in existing LTE without changing the existing LTE information structure. In addition, the transmission efficiency of uplink data can be improved.

In the above embodiments, preferably, the frequency hopping information is placed at an MSB (Most Significant Bit) of the control information, and the frequency-domain resource location information is placed at an LSB (Least Significant Bit) of the control information; or, the frequency hopping information is placed at the LSB of the control information, and the frequency-domain resource location information is placed at the MSB of the control information. And, bit information of indicating frequency hopping enabled is before bit information of indicating a frequency hopping type; or, bit information of indicating frequency hopping enabled is before bit information of indicating a frequency hopping type. Here, the frequency hopping information includes the bit information of indicating frequency hopping enabled and the bit information of indicating a frequency hopping type.

In the document, $$\binom{y}{x} = C_y^x,$$

that is, permutation and combination calculation, $$C_y^x = \frac{P_y^x}{x!}.$$

The above are only preferred embodiments of the disclosure, which are not intended to limit the disclosure. Any modifications, equivalent substitutions and improvements or the like made within the concept and principle of the disclosure shall fall within the scope of protection of the claims of the disclosure.

The invention claimed is:

1. A method for allocating a resource location with a frequency hopping function, comprising:
 acquiring, by an equipment, an uplink bandwidth of a Long Term Evolution (LTE) communication system;
 determining, by the equipment, whether frequency hopping information needs to be allocated to uplink continuous frequency-domain resource location information in a multi-antenna port transmission mode, and when the frequency hopping information needs to be allocated, obtaining a length of a resource location and frequency hopping bit indicator and a length of frequency-domain resource location information according to the uplink bandwidth;
 calculating, by the equipments, a difference Value_D between the length of the resource location and frequency hopping bit indicator and the length of the frequency-domain resource location information;
 allocating, by the equipment, frequency hopping information to the frequency-domain resource location information according to the difference Value_D;
 incorporating the frequency hopping information and the frequency-domain resource location information into downlink control information, and issuing to a terminal the downlink control information for instructing the terminal to transmit data information;
 wherein the allocating frequency hopping information to the frequency-domain resource location information according to the difference Value_D comprises:
 when Value_D=0, disabling frequency hopping;
 when Value_D=1, disabling frequency hopping, and setting an extra 1 bit to 0 or 1;
 when Value_D=2 and the uplink bandwidth is no less than 6 and no greater than 49, setting a frequency hopping enable indicator using 1 bit and setting a frequency hopping type indicator using other 1 bit;
 when Value_D=2 and the uplink bandwidth is no less than 50 and no greater than 110, disabling frequency hopping;
 when Value_D=3 and the uplink bandwidth is no less than 6 and no greater than 49, setting a frequency hopping enable indicator using 1 bit and a frequency hopping type indicator using other 2 bits, or setting a frequency hopping enable indicator using 2 bits and a frequency hopping type indicator using other 1 bit; and
 when Value_D=3 and the uplink bandwidth is no less than 50 and no greater than 110, setting a frequency hopping enable indicator using 1 bit and setting a frequency hopping type indicator using other 2 bits.

2. The method according to claim 1, wherein the frequency-domain the resource location information is placed at a Most Significant Bit (MSB) of the control information or at a Least Significant Bit (LSB) of the control information; and bit information of indicating frequency hopping enabled is before bit information of indicating a frequency hopping type.

3. The method according to claim 1, wherein the obtained length of the resource location and frequency hopping bit indicator is equal to $$\left\lceil \log_2\left(\binom{\lceil N_{RB}^{UL}/P+n \rceil}{4}\right)\right\rceil$$

or $$\left\lceil \log_2\left(\binom{\lceil N_{RB}^{UL}/P \rceil + n}{4}\right)\right\rceil,$$

where n represents an integer greater than 0, $N_{RB}^{UL}$ represents the uplink bandwidth, P represents a size of a Resource Block Group (RBG) and a value of P depends on the uplink bandwidth.

4. A device for allocating a resource location with a frequency hopping function, comprising at least one processor and a memory coupled to the at least one processor, wherein the at least one processor is configured to:
 acquire an uplink bandwidth of a Long Term Evolution (LTE) communication system;
 determine whether frequency hopping information needs to be allocated to uplink continuous frequency-domain resource location information in a multi-antenna port transmission mode of a user equipment, and when the frequency hopping information needs to be allocated, obtain a length of a resource location and frequency hopping bit indicator and a length of frequency-domain resource location information according to the uplink bandwidth;

calculate a difference Value_D between the length of the resource location and frequency hopping bit indicator and the length of the frequency-domain resource location information;

allocate frequency hopping information to the frequency-domain resource location information according to the difference Value_D; incorporate the frequency hopping information and the frequency-domain resource location information into downlink control information, and issue the downlink control information to a terminal for instructing the terminal to transmit data information;

wherein the allocating frequency hopping information to the frequency-domain resource location information according to the difference Value_D comprises:

when Value_D=0, disable frequency hopping;

when Value_D=1, disable frequency hopping, and set an extra 1 bit to 0 or 1;

when Value_D=2 and the uplink bandwidth is no less than 6 and no greater than 49, set a frequency hopping enable indicator using 1 bit and set a frequency hopping type indicator using other 1 bit;

when Value_D=2 and the uplink bandwidth is no less than 50 and no greater than 110, disable frequency hopping;

when Value_D=3 and the uplink bandwidth is no less than 6 and no greater than 49, set a frequency hopping enable indicator using 1 bit and a frequency hopping type indicator using other 2 bits, or set a frequency hopping enable indicator using 2 bits and a frequency hopping type indicator using other 1 bit; and when Value_D=3 and the uplink bandwidth is no less than 50 and no greater than 110, set a frequency hopping enable indicator using 1 bit and set a frequency hopping type indicator using other 2 bits.

5. The device according to claim 4, wherein the frequency-domain resource location information is placed at a Most Significant Bit (MSB) of the control information or at a Least Significant Bit (LSB) of the control information; and bit information of indicating frequency hopping enabled is before bit information of indicating a frequency hopping type.

6. The device according to claim 4, wherein the length of the resource location and frequency hopping bit indicator obtained through calculation by the information determination unit is equal to $$\left\lceil \log_2\left(\binom{\lceil N_{RB}^{UL}/P + n \rceil}{4}\right)\right\rceil$$

or $$\left\lceil \log_2\left(\binom{\lceil N_{RB}^{UL}/P \rceil + n}{4}\right)\right\rceil,$$

where n represents an integer greater than 0, $N_{RB}^{UL}$ represents the uplink bandwidth, P represents a size of a Resource Block Group (RBG) and a value of P depends on the uplink bandwidth.

* * * * *